INVENTOR.
JOHN F. SWEENEY
EDWARD T. ABLE
IRWIN A. MAC KAY

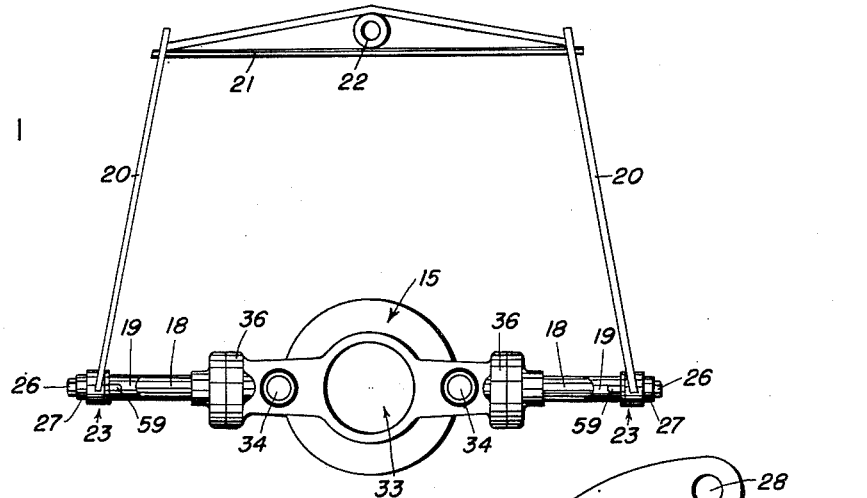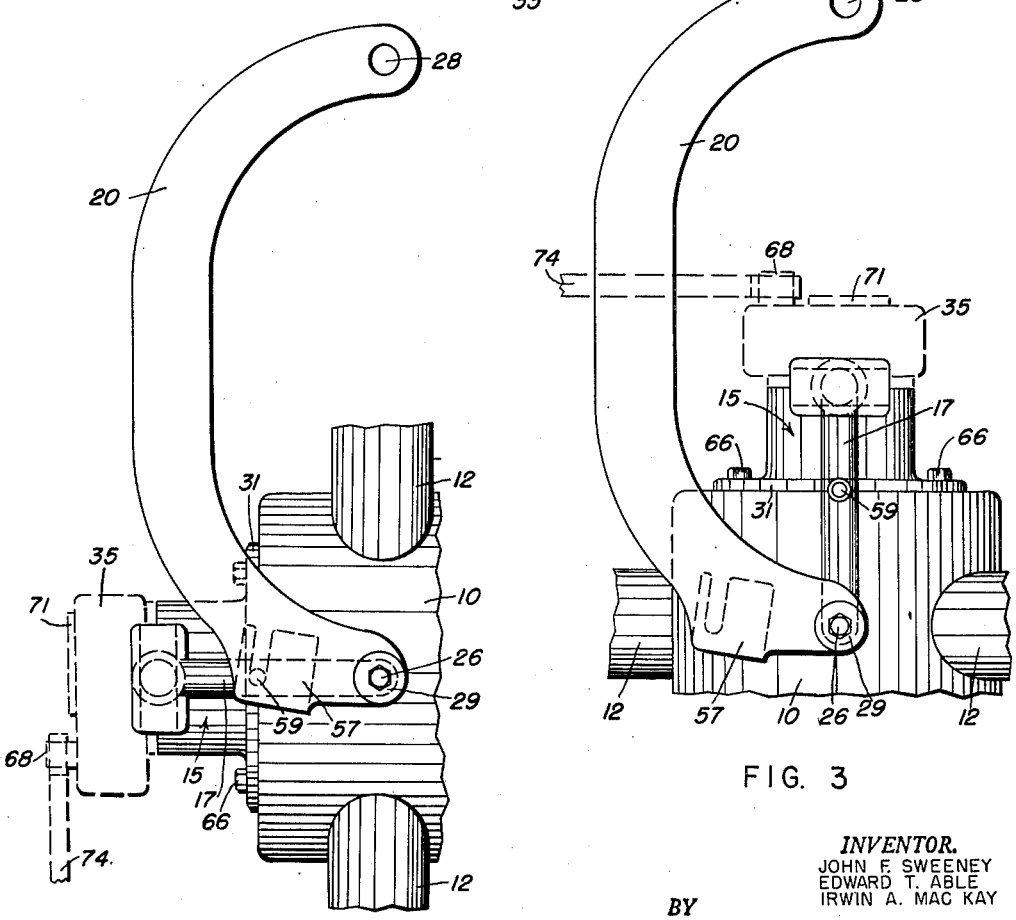

BY
Bertha L. MacGregor, atty

INVENTOR.
JOHN F. SWEENEY
EDWARD T. ABLE
IRWIN A. MAC KAY
BY Bertha L. MacGregor, atty May 12, 1953  J. F. SWEENEY ET AL  2,638,026
WRENCH FOR USE WITH AN AIRPLANE PROPELLER
Original Filed May 9, 1949  4 Sheets-Sheet 4

*INVENTOR.*
JOHN F. SWEENEY
EDWARD T. ABLE
IRWIN A. MAC KAY

BY

*Bertha L. M<sup>ac</sup> Gregor, atty.*

Patented May 12, 1953

2,638,026

UNITED STATES PATENT OFFICE 2,638,026

WRENCH FOR USE WITH AN AIRPLANE PROPELLER

John F. Sweeney, Edward T. Able, and Irwin A. MacKay, Denver, Colo., assignors to B. K. Sweeney Manufacturing Company, Denver, Colo., a corporation of Colorado Original application May 9, 1949, Serial No. 92,126. Divided and this application May 31, 1950, Serial No. 165,226

2 Claims. (Cl. 81—54)

This application is a division of our co-pending application Serial No. 92,126 filed May 9, 1949, which has matured into Patent No. 2,602,217, July 8, 1952.

This invention relates to a wrench for use with apparatus for servicing airplane propellers, such servicing apparatus including means for lifting and handling, and for loosening and tightening nuts which retain propellers on their motor shafts.

Airplane propellers require frequent servicing and for this purpose must be removed from their motor shafts, carried to a work shop, returned to the field or hangar, and replaced on the motor shafts of the planes. Propellers weigh as much as 1000 to 1200 pounds, and due to their shape and weight the servicing and handling present certain difficulties which it is the object of our invention to overcome.

The main object of our invention is to produce a wrench for use with apparatus which is adapted to be securely fastened to a propeller whereby the servicing device and the propeller may be lifted and moved without injury to the propeller.

Another object is to produce servicing mechanism of the character described which is designed to cooperate with a wrench for loosening and tightening the nuts which hold the propeller on its motor shaft, and to serve as anchor means for the wrench, including means for retaining the wrench in operative position on such anchor means. The wrench anchoring means of our invention may be used separately for the purpose of anchoring the wrench, or it may be part of means for lifting and handling the airplane propeller.

By "vertical position" of the propeller, we mean that the body and blades as a whole are vertically disposed and the axis of the hub extends in a horizontal plane. To support the propeller in such vertical position, the anchor means of the apparatus has its face vertically disposed and at right angles to the axis of the propeller hub.

In the drawings:

Fig. 1 is an elevational view of a servicing apparatus, showing the anchor means thereof with its face vertically disposed for attachment to an airplane propeller when the propeller is in vertical position.

Fig. 2 is a side elevational view of the servicing apparatus shown in Fig. 1, on an enlarged scale, showing the anchor means attached to the hub of a propeller, the propeller blades being broken away.

Fig. 3 is a view similar to Fig. 2 but showing the anchor means in horizontal position, as it appears when the propeller to which it has been secured is horizontally disposed and the axis of its hub is in a vertical plane.

Figure 4:
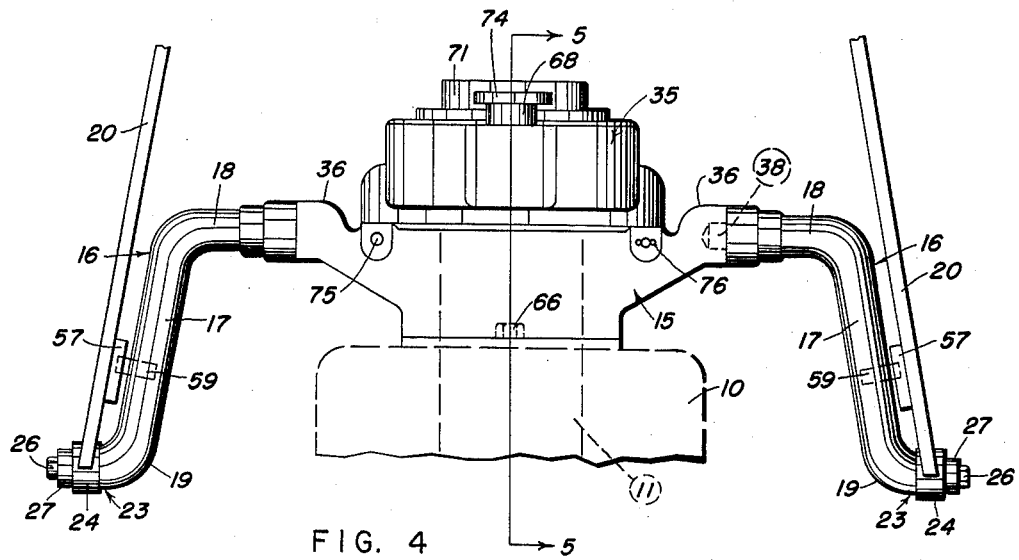
Fig. 4 is an elevational view of servicing apparatus, similar to that of Fig. 1, but showing the anchor means with its face horizontally disposed, attached to a propeller hub, with a wrench in position on the anchor means, as the parts appear when the propeller as a whole is horizontally disposed.

In the drawings, we have shown the preferred embodiment of our apparatus with which the improved wrench is adapted for use, and three different forms of anchor means used therein. These anchor means may be employed separately to function only as anchor means for a wrench when it is desired to work on the nut or nuts which hold the propeller on its shaft, or said anchor means may be part of the handling and lifting mechanism of our apparatus. The essential parts of the preferred form of servicing apparatus are (1) the anchor means which are securely but removably fastened to an airplane propeller and which serve to support and anchor a wrench during that part of the operation when it is necessary to loosen or tighten the nuts which retain the propeller on its motor shaft; (2) specially shaped lift arms rigidly connected to opposite ends of the anchor means and pivotally connected to a yoke; (3) said yoke comprising a pair of curved arms pivotally connected at one of their ends to said lift arms and connected together at their other ends by a cross piece which is adapted to be engaged by a crane or other suitable mechanism for lifting the servicing apparatus and attached propeller.

Referring first to Figs. 1 to 5, inclusive, an airplane hub is indicated at 10, its center bore at 11, blades (broken away) at 12, airplane motor shaft at 13 and a nut for retaining the hub on the shaft at 14. These are conventional parts of airplane propellers which vary in form and construction. The servicing apparatus of our invention likewise is varied in construction to some extent to accommodate itself to different forms of airplane propeller hubs and blades. For this reason it is necessary to provide different forms of anchor means adapted to be secured to the different airplane propellers to be serviced.

In Figs. 1 to 5, inclusive, the anchor device is indicated as a whole at 15, and has a body centrally apertured, adapted to be seated on the exposed face of an airplane propeller hub, concentric therewith, and provided with means for securely fastening the anchor means and hub together. A pair of lift arms 16, 16, are adapted to be rigidly connected to opposite sides of the anchor means 15. For convenience in shipping, the lift arms 16 are made separately from the anchor means 15, but when assembled they are in effect a single unit. Each of the arms 16 consists of an elongated member 17, an end 18 extending at an angle from one end of the member 17, and an end 19 extending at an angle from the other end of the member 17, parallel with but in a direction opposite to that of the end 18, as shown in Fig. 4. The arms 16 are identical but when secured at their ends 18 to opposite sides of the anchor means 15, their elongated portions 17 extend in slightly divergent directions with respect to each other. Assuming the faces of the anchor means 15 to be horizontally disposed, as shown in Fig. 4, the lift arms 16 extend downwardly so that the axis of their outwardly extending ends 19 intersects the center of gravity of the propeller hub 10.

The lifter yoke comprises two curved arms 20 resembling an elongated C when viewed in side elevation, and a connecting cross member 21 of any suitable construction secured to the upper ends of the arms 20, adapted to be engaged through the eyelet 22 by a crane or other suitable lifting mechanism. The curved arms 20 are relatively thin, in cross section, and when pivotally connected at their lower ends to the lift arm ends 19, said arms 20 are substantially parallel to the lift arm members 17.

The pivotal connection between the lift arms 16 and lifter yoke arms 20 is designated 23. It comprises a reinforcing bead 24 formed on the lower end of each arm 20, surrounding a hole 25 through the arm 20, the faces of the bead 24 projecting beyond the side surfaces of the arm 20 and at an angle thereto; that is to say, the axis of the hole 25 coincides with the axis of the lift arm end 19, and the faces of the reinforcing bead 24 are perpendicular to the axis of the hole 25 and at an angle to the flat side surfaces of the C-arms 20 which are slightly inclined toward each other as shown in Figs. 1 and 4. The ends 19 of the lift arms 16 have reduced portions which extend through the holes 25 of the C-arms 20 and are pivotally retained by a bolt 26 which extends through a cap washer 27 into the reduced portion of the lift arm end 19.

At the upper ends the C-arms 20 are provided with apertures 28 to receive the ends of the cross piece 21 which are rigidly connected thereto in any convenient manner. For certain purposes these parts may be made separately but when assembled the anchor means 15, the lift arms 16 and the lifter yoke 20, 21, are rigidly connected together excepting at the connections 23 between the ends 19 of the lift arms 16 and the lower ends of the C-arms 20, which afford pivotal movement between the lift arms 16 and the C-arms 20.

In Figs. 6 to 13, inclusive, are shown three different forms of anchor means such as referred to heretofore by the numeral 15, and these will be described now in detail. Each of these forms is adapted to be used separately only as anchoring means for a wrench or to be connected to lift arms 16 to become part of the handling and lifting means of our servicing apparatus.

Figure 6:
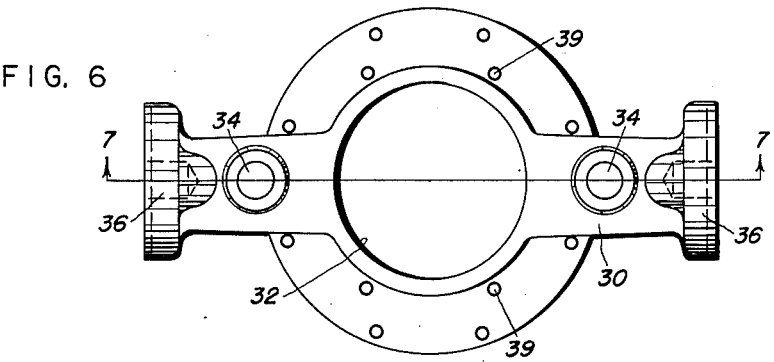
Fig. 6 is a plan view of anchor means which constitute part of our servicing apparatus.
Figure 7:
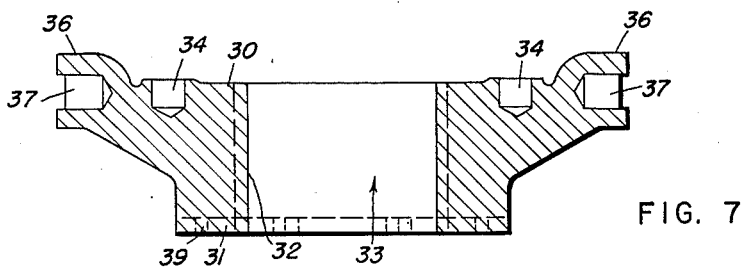
Fig. 7 is a longitudinal sectional view of the anchor means of Fig. 6, taken in the plane of the line 7—7 of Fig. 6.

Referring to Figs. 6 and 7, the anchor means there shown comprise an outer plate 30, an inner plate 31, both centrally apertured and connected together, thus providing a concentric opening 33 adapted to register with the bore 11 of the propeller hub 10. The outer plate 30 is provided with recesses 34 adapted to receive and anchor parts of a wrench 35. Said plate is designed to support the wrench in operative position when it is desired to loosen or tighten the nut 14 on the motor shaft 13 whereby the propeller hub is held on the shaft. The outer anchor plate 30 is provided with oppositely extended portions which terminate in shoulders 36 provided with recesses 37. The recesses 37 are axially aligned and arranged to receive the reduced portions of the ends 18 of the lift arms 16 which are retained therein by any suitable means as indicated at 38 in Fig. 4.

The inner plate 31 is so called because it constitutes that face of the anchor means which contacts the face of the propeller hub when the apparatus is fastened to the hub 10. Said inner plate 31 is provided with a plurality of holes 39 adapted to receive screws or bolts whereby the anchor means is securely but removably fastened to the face of the propeller hub.

Figure 8:
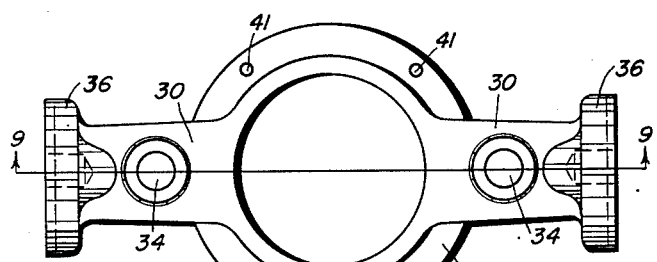
Fig. 8 is a plan view of a modified form of anchor means which constitute part of the servicing apparatus.
Figure 9:
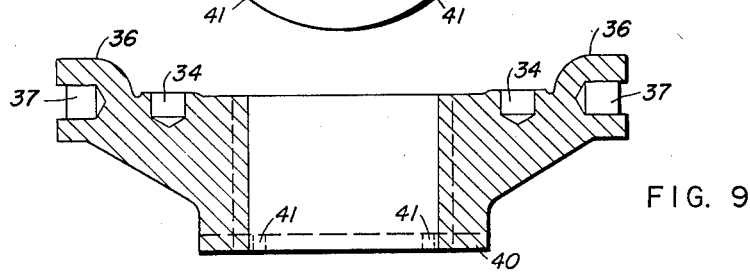
Fig. 9 is a longitudinal sectional view of the same taken in the plane of the line 9—9 of Fig. 8.
Figure 10:
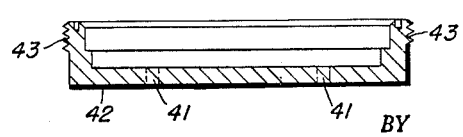
Fig. 10 is a sectional view of a nut member used with the anchor of Figs. 8 and 9.

Referring to the modified form of anchor means shown in Figs. 8, 9 and 10, those parts of the construction which are similar to the parts described in connection with Figs. 6 and 7 have been similarly designated. This form of construction is particularly adapted to be mounted on propellers provided with screw threads for engaging a part of the anchor means. In this embodiment, the inner plate is designated 40, and is provided with holes 41. A separate ring or nut 42 has external screw threads 43. The nut 42 is slipped onto the inner plate 40 and is secured thereto by bolts (not shown) in the holes 41. The threads 43 on nut 42 engage threads on the airplane propeller hub.

Figure 11:
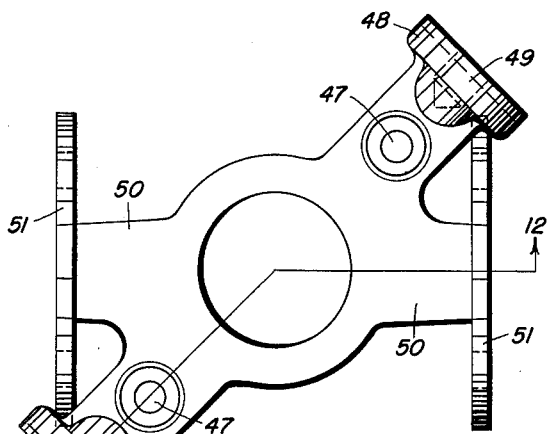
Fig. 11 is a plan view of another modification of the anchor means.
Figure 12:
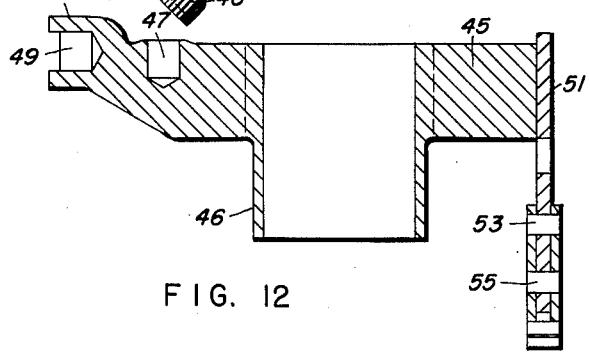
Fig. 12 is a longitudinal sectional view taken in the plane of the line 12—12 of Fig. 11, and the planes indicated by the line 12—12 of Fig. 13.
Figure 13:
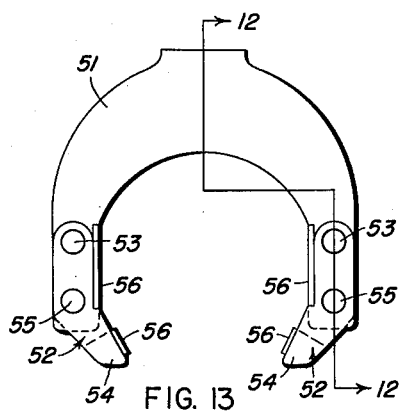
Fig. 13 is an end elevational view of one of the two gripping jaws which are part of the anchor means shown in Figs. 11 and 12.

In Figs. 11, 12 and 13, we have shown a special form of anchor means designed for attachment to propellers which do not lend themselves to cooperation with the forms of anchor means shown in the other figures just described. In this modification, the anchor means comprises an outer plate 45 integral with a sleeve 46 which is concentric with the bore of the propeller hub 10. Said plate 45 has oppositely extending portions provided with wrench seating recesses 47, and shoulders 48 with recesses 49 for receiving the ends 18 of lifts arms 16, as heretofore described.

The special feature of this anchor device is the arrangement whereby the anchor plate is secured to the propeller blade sockets 12. This feature comprises a pair of extensions 50 on the plate 45 located radially opposite each other or otherwise as required by the location of the propeller blade sockets. The extensions 50 terminate in jaws 51 each comprising a horseshoe shaped body having two pivotally mounted arms 52. Each arm 52 is pivotally connected by a pin or rivet 53 to the horseshoe body, so that the gripping end 54 can swing outwardly away from its mate and thus permit the jaws 51 to be placed over a propeller blade socket. When in position the gripping ends 54 are moved toward each other and a pin 55 is inserted through apertures in the body of the jaw 51 and in the arm 52 as shown in Fig. 13, whereby separation of the gripping ends 54 is prevented.

Preferably the inner surfaces of the arms 52 and gripping ends 54 are lined with rubber belting 56 or other resilient material which prevents them from chafing the blade sockets.

Figure 14:
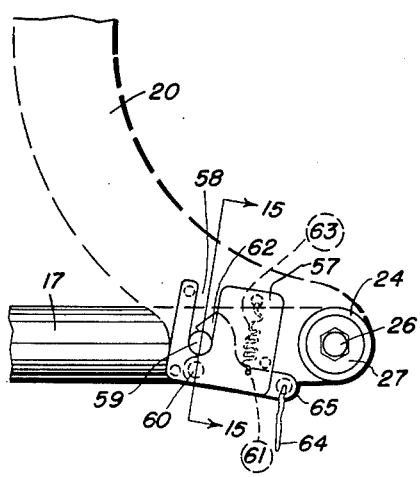
Fig. 14 is an elevational side view of the locking means for preventing relative movement between the pivotally connected parts of the servicing mechanism.
Figure 15:
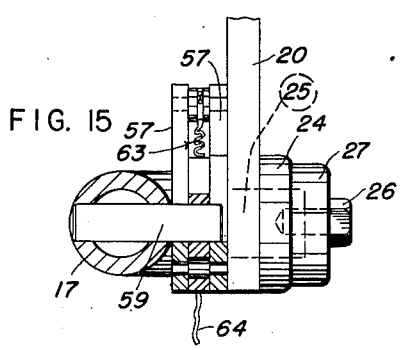
Fig. 15 is a transverse sectional view taken in the plane of the line 15—15 of Fig. 14.

In Figs. 14 and 15 are shown details of the locking mechanism attached to each of the C-arms 20 of the lifter yoke for cooperation with a part on the adjacent lift arm 16 for locking the pivotally connected parts of the servicing apparatus together and preventing pivotal movement between them at either limit of their movements. Said lock mechanism comprises a pair of spaced apart, parallel plates 57 cut away to provide a slot 58 open at one end, adapted to receive a pin 59 fixed on the number 17 of the lift arm 16. Between the plates 57 is pivotally mounted at 60 a bell crank lever 61, one arm of which is hook shaped as indicated at 62. The arm 62 engages the pin 59 on the lift arm when the parts are in locked position. A coiled spring 63 secured to the lever 61 and to one of the plates 57 retains the parts in locking position. When it is desired to release the latching device 62 from the pin 59, a pull cord 64 attached to the exposed end 65 of the bell crank lever may be actuated to pivotally move the lever and release said hook device 62. The locking device described is one designed to hold the pivotally connected parts of the apparatus against relative movement when the propeller is in vertical position, but similar locking mechanism may be positioned to function for holding said parts when the propeller is in horizontal position.

Each of the anchor means herein described is securely fastened to the work, and the body of the wrench 35 is securely fastened to the anchor in such position that the wrench socket, anchor aperture and propeller hub are concentrically positioned, and the counter rotative torque of the wrench when in operation is borne by the anchor.

Figure 5:
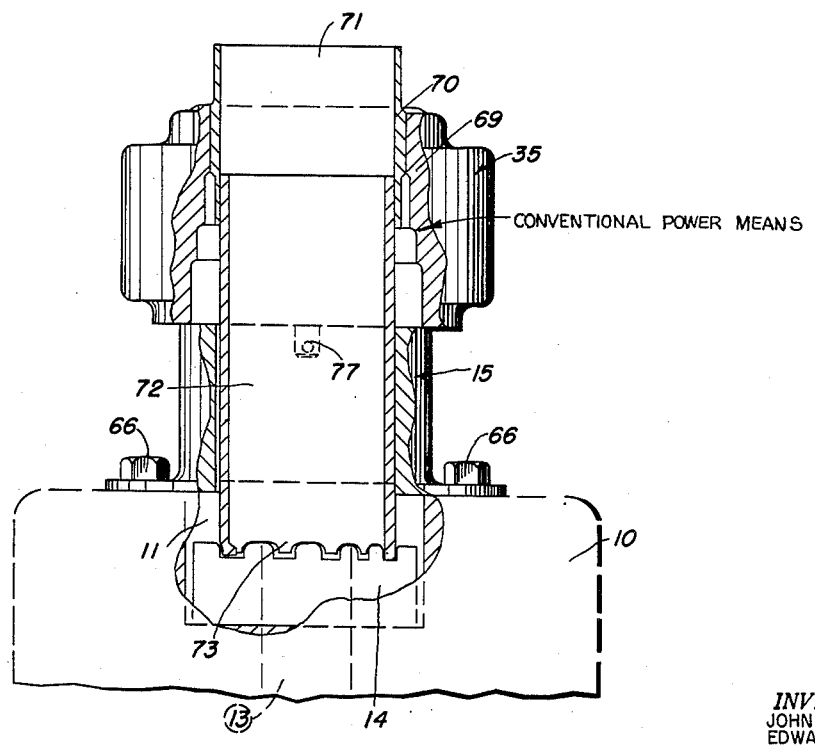
Fig. 5 is a transverse vertical sectional view, partly in elevation, taken in the plane of the line 5—5 of Fig. 4, but somewhat enlarged.

It will be understood that each of the anchor means described herewith is provided with a bore concentric with the bore of the propeller hub, whereby the tool employed to work on nuts on the airplane motor shaft can be inserted through the anchor means and be actuated inside of the propeller hub while the anchor for the tool serves as the connecting means between our servicing apparatus and the propeller. An example of how this construction serves is shown in Figs. 4 and 5, where the wrench 35 is supported on the anchor means 15 and the latter is securely fastened to the propeller hub 10 by bolts 66. The internal construction of the wrench 35 need not be shown in detail. Any power multiplying wrench mechanism may be used. In the wrench 35, a train of gears is employed to provide the desired gear ratio between the power input shaft 68 and the power output shaft 69. Internal splines in said shaft 69 in this embodiment engage external splines 70 on the part 71 of the socket 72. The socket 72 is shaped as indicated at 73 to fit the castellated nut 14 which holds the propeller hub 10 on its shaft 13. A handle 74 engages the shaft 68 of the wrench for rotating the shaft.

The wrench 35 is held on the anchor means 15 by anchor pins 75, one of which may be self-locking and the other locked with a thumb-screw 76. 77 indicates depending pins on the wrench which seat in the recesses 34 or 47 of the anchor means, whereby the wrench is properly positioned on said anchor means.

*Operation.*—When an airplane propeller requires servicing, our servicing apparatus is moved into juxtaposition to the propeller by means of a lifting crane or other suitable mechanism which engages the eye 22 of the cross piece 21. The anchor means 15 is securely fastened to the propeller hub 10 or to the blade sockets 12 depending on the type of anchor means selected from the three shown in Figs. 6 to 13, inclusive. At this stage of the operation, inner and outer anchor plates such as the plates 30 and 31, Figs. 6 and 8, or the outer plate 45, Fig. 11, will be vertically disposed, with the opening 33 concentric with the bore of the propeller hub and the axis in a substantially horizontal plane. The members 17 of the lift arms 16 will also extend horizontally while the C-arms remain substantially vertical as shown in Fig. 2. It will be noted that the shape of the C-arms is such that they do not interfere with the propeller blades even though the end of said arms 20 are pivotally connected to the lift arms 16 in an axial line which intersects the center of gravity of the propeller hub regardless of the position of the propeller. The locking means automatically functions to prevent relative movement between the pivotally connected parts, when the propeller has been moved to either vertical or horizontal position.

Next the wrench 35 is mounted on the anchor means 15, and in order to prevent the wrench from falling off the anchor plate, the fastening means 75 and 76 are employed. Then the wrench is manually operated to loosen the nut 14 or other nuts which may hold the propeller on its shaft, and when the propeller is ready to be removed from the shaft the servicing apparatus, as a whole, actuated by a lifting crane (not shown), moves the propeller forwardly off its shaft and clear thereof. The wrench may be removed from the anchor plate before the propeller is moved off its shaft, or it may be left on the anchor plate during the propeller moving operation, as preferred. After the propeller has cleared the shaft, the locking mechanism may be actuated by the pull cord 64 to release the latching device 62 and allow the propeller to be swung into horizontal position, as shown in Fig. 3 (where the wrench is still on the anchor means), as is most convenient for transporting the propeller on a truck to the workshop for service.

Usually the servicing apparatus is removed from the propeller while it is being serviced. After the servicing has been completed, the anchor means of the servicing apparatus is reattached to the propeller hub (or blade sockets) and the appartus and propeller are carried back to the airplane. Before attempting to remount the propeller on its shaft, it is most convenient to position the wrench on the horizontally disposed anchor means, secure the fastening devices 75 and 76, lift the servicing apparatus and propeller free of the transporting means, swing the propeller into vertical position, lock the pivotally connected parts of the servicing apparatus against relative movement and then slip the propeller, with attached servicing apparatus and wrench, into position on the motor shaft. The wrench is then employed to tighten the nut or nuts which hold the propeller on its shaft. Finally the anchor means is disconnected from the replaced propeller.

From the foregoing description, it will be apparent that the servicing apparatus of our invention comprises a rigid yoke consisting of the C-arms 20 and connecting piece 21 which may be termed an outer yoke, and a second rigid yoke consisting of the lift arms 16 and intermediate anchor means 15 which may be termed an inner yoke in the sense that it is movable between the C-arms 20 of the outer yoke. The inner and outer yoke members are pivotally connected together at 23 as heretofore explained, and the relationship between the pivotal connection and that part of the anchor means 15 which is fastened to the propeller hub is such that the axis of the pivotal connection intersects the center of gravity of the propeller. This arrangement insures efficient handling of the propeller with a minimum of effort.

The dual function of the anchor means as anchor means, per se, or as part of the inner yoke is another important feature of our invention. Heretofore the services of a number of workmen were required to hold a wrench in proper position relatively to the propeller and to operate it for the purpose of loosening or tightening the retaining nut or nuts. By employing our anchor means, separately or as part of the apparatus as a whole, the wrench is supported and retained in operative position on the anchor means for efficient operation of the wrench. The large central openings through the wrench socket 72 and output gear 69 are of such dimensions that the operator of the wrench can put his hand through the hollow socket and place a locking mechanism in the propeller nut without removing either the wrench or the socket which extends through the anchor opening into contact with the work. This makes our apparatus especially suitable for servicing airplane propellers.

Changes may be made in the form and dimensions of our apparatus, and in details of construction, without departing from the scope of our invention as defined by the appended claims.

We claim:

1. A wrench for use with an airplane propeller wherein the hub thereof is secured to a motor shaft by means of a nut accessible from an end of the hub, and wherein an anchor member is detachably secured to said hub and provided with a cylindrical walled opening coaxial with and through which said nut is accessible; said wrench comprising a housing for support on said anchor member and being provided with means for releasably securing the same to the anchor member, an elongated cylindrical socket member extending through said housing and being extendable through said opening in said anchor member and having means on one end thereof for rotatable locking engagement with the nut, and power means in said housing for rotating said socket member with a corresponding rotation of the nut.

2. The structure according to claim 1 wherein said socket member is provided with open opposite ends for access to the nut therethrough.

JOHN F. SWEENEY.
EDWARD T. ABLE.
IRWIN A. MacKAY.

References Cited in the file of this patent
UNITED STATES PATENTS

| Number | Name | Date |
|---|---|---|
| 1,042,736 | Wildmo | Oct. 29, 1912 |
| 1,150,178 | Diefendorf | Aug. 17, 1915 |
| 1,324,405 | Morgan | Dec. 9, 1919 |
| 1,324,704 | Vose | Dec. 9, 1919 |
| 1,468,334 | Thomason | Sept. 18, 1923 |
| 1,963,202 | Hume | June 19, 1934 |
| 2,172,272 | Booth | Sept. 5, 1939 |
| 2,235,953 | Whitfield | Mar. 25, 1941 |
| 2,434,660 | Knight | Jan. 20, 1948 |
| 2,459,672 | Morsch | Jan. 18, 1949 |
| 2,461,983 | Jarrett | Feb. 15, 1949 |

FOREIGN PATENTS

| Number | Country | Date |
|---|---|---|
| 369,040 | Great Britain | Mar. 17, 1932 |